United States Patent
Itoh

[11] 4,168,110
[45] Sep. 18, 1979

[54] ZOOM LENS HAVING SMALL DISTORTION

[75] Inventor: Takayuki Itoh, Tokyo, Japan

[73] Assignee: Asahi Kogaku Kogyo Kabushiki Kaisha, Tokyo, Japan

[21] Appl. No.: 952,184

[22] Filed: Oct. 17, 1978

[30] Foreign Application Priority Data

Oct. 19, 1977 [JP] Japan ................. 52-125577

[51] Int. Cl.² ............................................. G02B 15/14
[52] U.S. Cl. ...................................... 350/184; 350/176
[58] Field of Search ........................... 350/184, 176

[56] References Cited
U.S. PATENT DOCUMENTS

| 3,848,969 | 11/1974 | Tajima | 350/184 |
| 4,074,931 | 2/1978 | Okudaira | 350/184 |

Primary Examiner—Paul A. Sacher
Attorney, Agent, or Firm—Sughrue, Rothwell, Mion, Zinn and Macpeak

[57] ABSTRACT

A zoom lens having small distortion including a front lens group having a negative focal length and a rear lens group having a positive focal length, the front and rear lens groups being mechanically movable to vary the overall focal length while maintaining the image position constant.

4 Claims, 16 Drawing Figures

ZOOM LENS HAVING SMALL DISTORTION

BACKGROUND OF THE INVENTION

The present invention provides a miniaturized zoom lens system, wherein various aberrations are well compensated for over the full zoom range, and particularly, distortion. This is most difficult to compensate for in a zoom lens and is well compensated, to the same extent as in a fixed focus lens.

In a conventional two-group type zoom lens which is constructed of a first lens group (I lens group) having a negative focal length and a second lens group (II lens group) having a positive focal length, barrel distortion is markedly generated at the short focal length end. It is, therefore, difficult to obtain a miniaturized zoom lens having a small distortion to the same extent as a fixed focus lens. Hence, conventional zoom lenses have tended to be large and cumbersome.

A zoom lens having small distortion is disclosed in U.S. application Ser. No. 928,321 filed on July 26, 1978 and entitled "ZOOM LENS HAVING A SMALL DISTORTION ABERRATION". The lens disclosed therein offers a novel zoom type lens having a small distortion, which is composed of a first lens group having a negative focal length, a second lens group having a positive focal length and a third lens group having a negative focal length, the aerial spaces between the first and second lens groups and between the second and third lens groups being variable.

The above-described U.S. application Ser. No. 928,321 discloses a recognition that although barrel distortion is markedly generated between the first and second lens groups at the short focal length end, the aerial space between the second and third lens groups can be varied to be long on the short focal length side and to be short on the long focal length side. With such a technique it is relatively easy to maintain barrel distortion at a small level and at the same time spinning pin cushion distortion can also compensated to low levels.

SUMMARY OF THE INVENTION

The lens system according to the present invention provides a miniaturized zoom lens having small distortion and the other various aberrations to be well compensated, by arranging a third lens group having a negative focal length after a second lens group of a conventional two-group zoom lens whereby the rear lens group of the invention is composed of the second lens group and the additional third lens group which is fixed with respect to the third lens group.

According to the invention, distortion is well compensated for without the variation of the space between the second and third lens groups. In the invention, distortion is already compensated for between the first and second lens groups and maintained at a small level. Spherical aberration, coma aberration, astigmatism, field curvature aberration and the like which are generated due to such compensation are well compensated for by the third lens group. As a result, a zoom lens having small overall distortion is obtained. Barrel distortion is markedly generated between the first and second lens groups on the short focal length side and the compensation of distortion is enhanced better on the short focal length side than on the long focal length side by great lens power of the third lens group whereby spinning pin cushion distortion is compensated to be small at the long focal length end and at the same time barrel distortion is compensated for to be small at the short focal length end. It is known that a conventional two-group type zoom lens is available for a wide angle lens but is not available for a telephoto lens. However, the invention widens the application range of a two-lens group zoom lens to a telephoto lens by use of the additional lens group to the rear lens group.

DESCRIPTION OF THE PREFERRED EMBODIMENT

The present invention will now be described. A zoom lens of the invention is composed, in order from the object side, of a front lens group having a negative focal length and a rear lens group having a positive focal length, in order to satisfy the condition (1) set forth below. The overall focal length is variable by mechanical movement of the front and rear lens groups while maintaining the image position constant. The front lens group is a first lens group I and the rear lens group is composed of a second lens group II having a positive focal length and a third lens group III having a negative focal length.

The first lens group I is composed, in order from the object side, of negative and positive lens components, the negative lens component on the object side being constructed of at least two negative lens. The second lens group II is composed, in order from the object side, of positive, negative and positive lens components, the positive lens components on the object side being constructed of two or three positive lenses. The third lens group III is composed, in order from the object side, of a positive lens having a strong convex surface, on the image side, directed to the image and a negative lens having a strong concave surface, on the object side, directed to the object or in order from the object side, of a positive lens having a strong convex surface, on the image side, directed to the image and a negative double concave lens, and finally a positive lens having a strong convex surface, on the object side, directed to the object. The zoom lens having a small distortion satisfies the following conditions.

$$1.0 < f_W/f_{WIII} < 2.0 \quad (1)$$

$$0.0 < f_W/|f_{III}| < 1.0 \quad (2)$$

$$1.0 < f_W/f_{III\,1} < 2.0 \quad (3)$$

$$0.0 \leq l_{III\,1}/f_W < 0.05 \quad (4)$$

$$-0.5 < \Sigma p_{III} < 0.0 \quad (5)$$

where:

$f_W$ is the overall focal length at the short focal length end;

$f_{W\,I\,II}$ is the resultant focal length of the first and second lens groups (I and II);

$f_{III}$ is the focal length of the third lens group III;

$f_{III\,1}$ is the focal length of the first positive lens on the object side in the third lens group III;

$l_{III\,1}$ is the aerial space between the first positive lens and the first negative lens on the object side in the third lens group III; and $\Sigma P_{III}$ is the Petzval's sum of the third lens group III when the overall focal length at the short focal length end is estimated as 1.0.

The first lens group I and the second lens group II are well known as a two-group type zoom lens. The improvement of this invention comprises the third lens group III having a negative focal length disposed after the second lens group II (on the image side). The rear lens group is therefore composed of the second lens group and the novel third lens group is provide a zoom lens having a small distortion.

Conditions (1) and (2) relate to a lens power arrangement of the lens system and also define the rear lens group to split it into the second lens group II and the third lens group III. Exceeding the lower limit of condition (1), the third lens group III does not have a negative focal length to enlarge the lens system. when exceeding the upper limit, miniaturization is available, but barrel distortion is remarkable and the back focal length becomes disadvantageously small. In order to compensate for this aberration, the negative lens power of the third lens group III must be enhanced and in turn, the other aberrations are difficult to compensate for.

Condition (2) cooperates with condition (1). Above the upper limit of condition (2), though miniaturization of the lens system is possible, the lens power of the third lens is too excessive to compensate for astigmatism, field curvature aberration and the like and the distortion with a good balance.

Conditions (3), (4) and (5) relate to the third lens group which is most important in the invention. The third lens group serves tp compensate for the various aberrations generated between the first lens group I and the second lens group II by means of the positive lens having a strong lens power on the object side and the next negative lens having a strong power. When exceeding the lower limit of condition (3), it is impossible to compensate for the various aberrations generated between the first lens group I and the second lens group II, and if the various aberrations are compensated for using only the first and second lens groups, the lens system is large.

Exceeding the upper limit, not only the lens power of the first positive lens in the third group but the negative lens power of the lens component succeeding the first positive lens becomes too strong. This leads to difficulty in compensation for spherical aberration, astigmatism, field curvature aberration and the like and distortion with a good balance. Also it is difficult to prevent variations and increases of the various aberrations with the movement of the overall focal length.

Condition (4) cooperates with condition (3). By exceeding the upper limit of the condition (4), the aerial space between the first positive lens having a strong power in the third lens group III and the lens component having a negative lens power and succeeding the first positive lens is excessively widened. As a result, it is difficult to compensate for spherical aberration, astigmatism field curvature aberration and distortion with a good balance and also to prevent the variations and increases of the various aberrations with the movement of the overall focal length. In order to compensate for the various aberrations, the lens power of each lens in the third lens group must be small. This accordingly leads to the enlargement of the lens system.

Condition (5) relates to field curvature. Above the upper limit, it is impossible to compensate for negative aberration of the image generated by the second lens group. Below the lower limit, the Petzval's sum is large resulting in a too positive image having poor planeness.

For one aberration compensation, it is desired to provide a fixed stop diaphragm after the third lens (on the image side), which can be moved in response to the variation of the focal length or stopping-down aperture that can be opened and closed for preventing the generation of a flare.

Specific Examples 1 to 4 will now be discribed. In the Examples:

f is the focal length, $\omega$ is a half of view angle;

r is the radius of curvature;

d is the lens thickness or the space between the adjacent lenses;

N is the refractive index on d-line; and $\nu$ is Abbe's number.

Also, the figures relate specifically to these examples and in the figures:

$r_i$ is the radius of curvature of the i-th surface;

$d_i$ is the lens thickness with respect to the i-th surface or the space between adjacent lens;

A is the stop diaphragm;

B is the fixed stop diaphragm; and $L_i$ is the i-th lens element.

EXAMPLE 1

Figures 1, 2A:
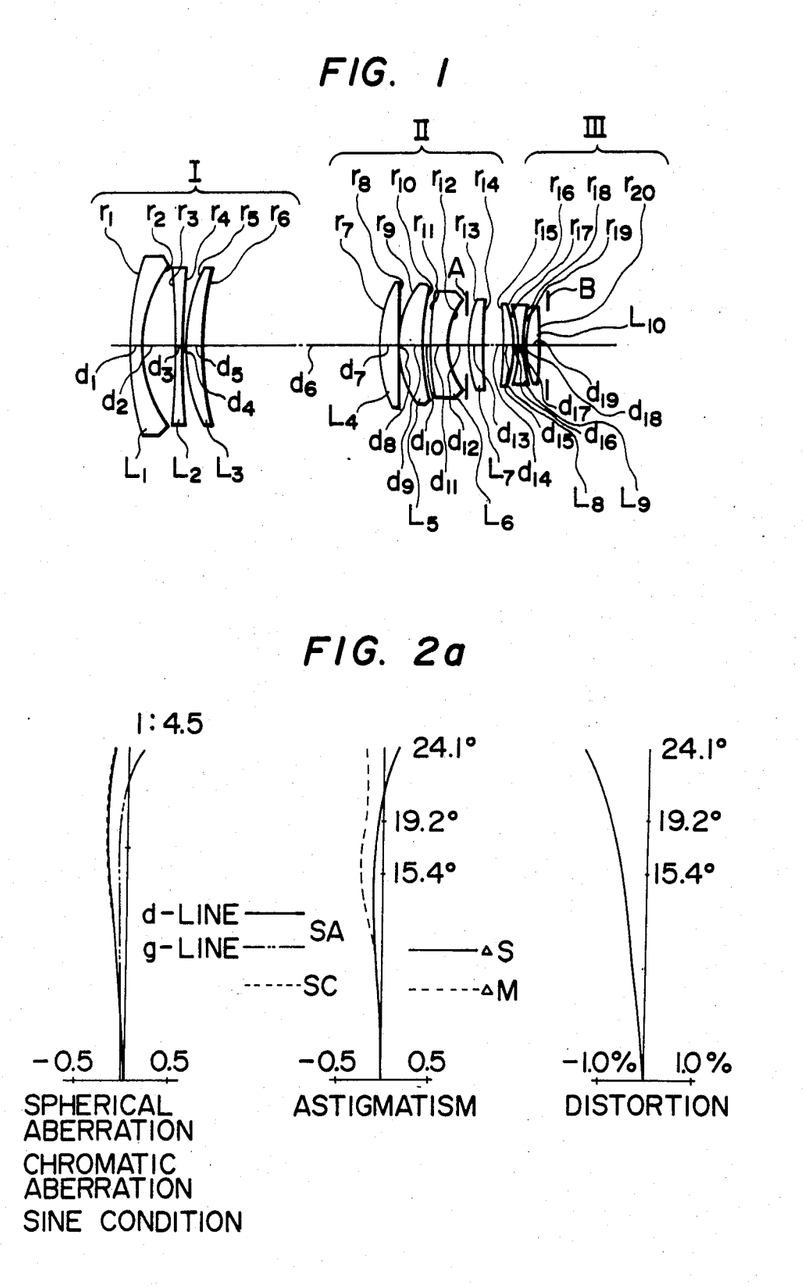
FIG. 1 shows a lens construction at the short focal end corresponding to Example 1.
FIGS. 2a, 2b and 2c show graphs of the various aberrations of Example 1, a, b and c designating the short focal length end, the middle focal length range and the long focal length end, respectively.
Figure 2B:
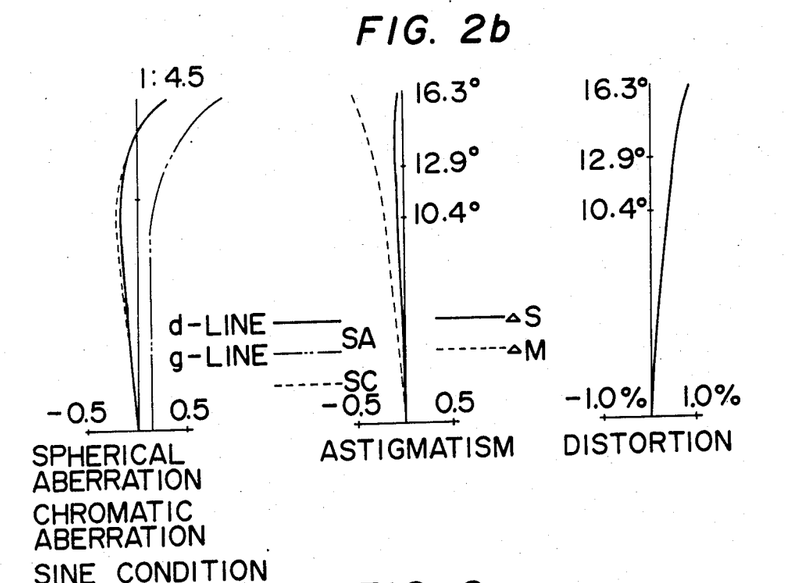
Figure 2C:
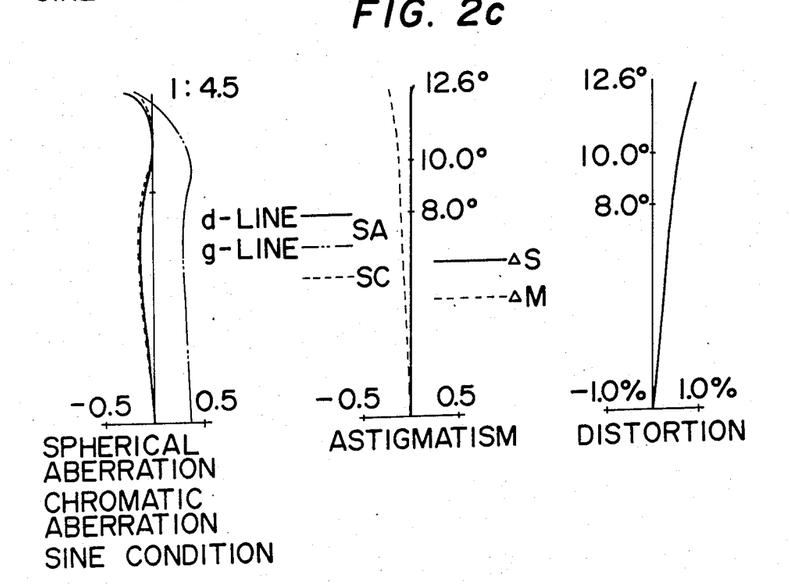

Referring now to FIGS. 1 and 2, the following parameters are germane.

| | | 1 : 4.50 | f = 100–195 | | $\omega$ = 24.1°–12.6° | |
|---|---|---|---|---|---|---|
| | LENS | LENS SURFACE NO. | r | d | N | $\nu$ |
| FIRST LENS GROUP I | $L_1$ | 1 = | 156.344 | $d_1$ = 4.27 | $N_1$ = 1.83400 | $\nu_1$ = 37.2 |
| | | $r_2$ = | 56.516 | $d_2$ = 14.27 | | |
| | $L_2$ | $r_3$ = | −393.706 | $d_3$ = 3.05 | $N_2$ = 1.50048 | $\nu_2$ = 65.9 |
| | | $r_4$ = | 390.567 | $d_4$ = 1.78 | | |
| | $L_3$ | $r_5$ = | 78.629 | $d_5$ = 7.56 | $N_3$ = 4.80518 | $\nu_3$ = 25.4 |
| | | $r_6$ = | 164.075 | $d_6$ = 78.43 | | |

-continued

| | | | r | d | N | ν |
|---|---|---|---|---|---|---|
| SECOND LENS GROUP II | L4 | $r_7 =$ | 72.444 | $d_7 = 6.95$ | $N_4 = 67000$ | $\nu_4 = 57.4$ |
| | | $r_8 =$ | 1026.876 | $d_8 = 0.12$ | | |
| | L5 | $r_9 =$ | 42.680 | $d_9 = 10.84$ | $N_5 = 77250$ | $\nu_5 = 49.6$ |
| | | $r_{10} =$ | 96.602 | $d_{10} = 3.95$ | | |
| | L6 | $r_{11} =$ | 196.755 | $d_{11} = 6.15$ | $N_6 = 1.80518$ | $\nu_6 = 25.4$ |
| | | $r_{12} =$ | 31.451 | $d_{12} = 9.51$ | | |
| | L7 | $r_{13} =$ | 55.109 | $d_{13} = 6.30$ | $N_7 = 1.61720$ | $\nu_7 = 54.0$ |
| | | $r_{14} =$ | 307.171 | $d_{14} = 7.67$ | | |
| THIRD LENS GROUP III | L8 | $r_{15} =$ | −36212.899 | $d_{15} = 5.24$ | $N_8 = 1.59551$ | $\nu_8 = 39.2$ |
| | | $r_{16} =$ | −46.988 | $d_{16} = 1.91$ | | |
| | | $r_{17} =$ | −44.294 | $d_{17} = 2.44$ | $N_9 = 1.69680$ | $\nu_9 = 55.5$ |
| | L9 | $r_{18} =$ | 43.651 | $d_{18} = 1.44$ | | |
| | | $r_{19} =$ | 50.073 | $d_{19} = 5.49$ | $N_{10} = 1.62041$ | $\nu_{10} = 60.3$ |
| | L10 | $r_{20} =$ | −170.978 | | | |

| OVERALL FOCAL LENGTH (f) | 100 | 150 | 195 |
|---|---|---|---|
| $d_6$ | 78.43 | 25.06 | 0.43 |

$f_W f_{WIII} = 1.213$ $f_W / |f_{III}| = 0.214$ $f_W / f_{III\,1} = 1.266$ $l_{III\,1} / f_W = 0.0191$ $\Sigma P_{III} = -0.086$ The step diaphragm is 8.29 after the twelfth surface. The fixed stop diaphragm is l after the twentieth surface and movable in response to the focal length.

| OVERALL FOCAL LENGTH (f) | 100 | 150 | 195 |
|---|---|---|---|
| l | 3.41 | 14.62 | 22.75 |

The stop aperture of the fixed diaphragm is 15.24.

EXAMPLE 2

Figure 3:
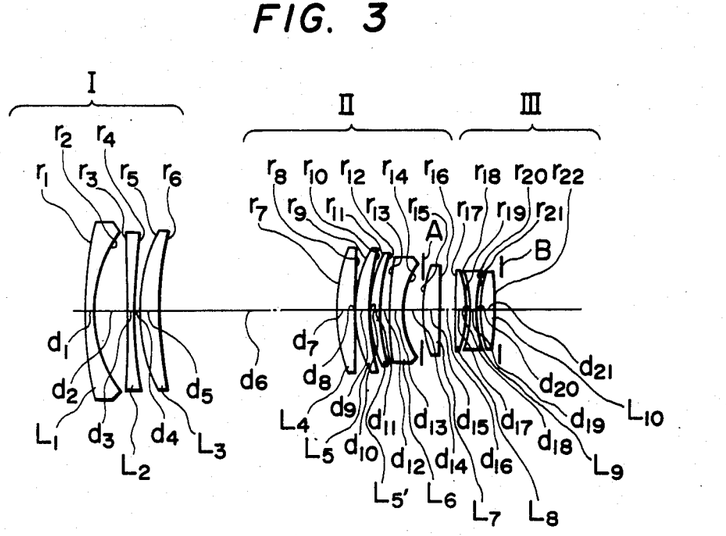
FIG. 3 shows a lens construction at the short focal length end corresponding to Example 2.
Figure 4A:
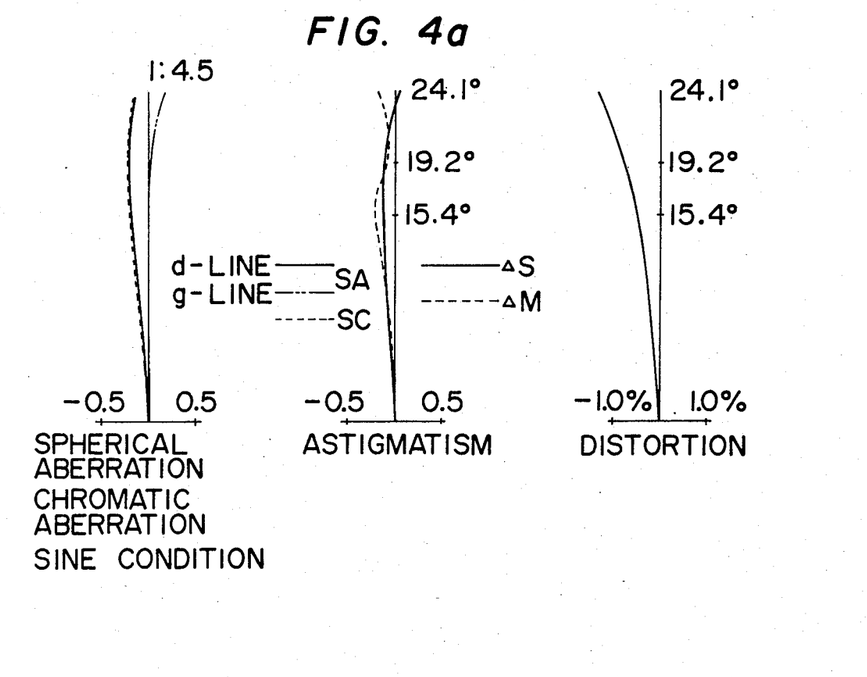
FIGS. 4a, 4b and 4c show graphs of the various aberrations of Example 2.
Figure 4B:
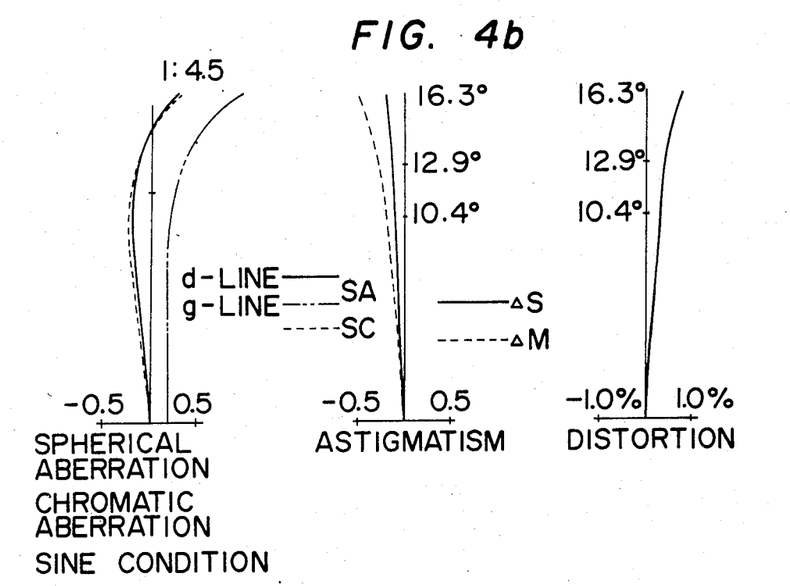
Figure 4C:
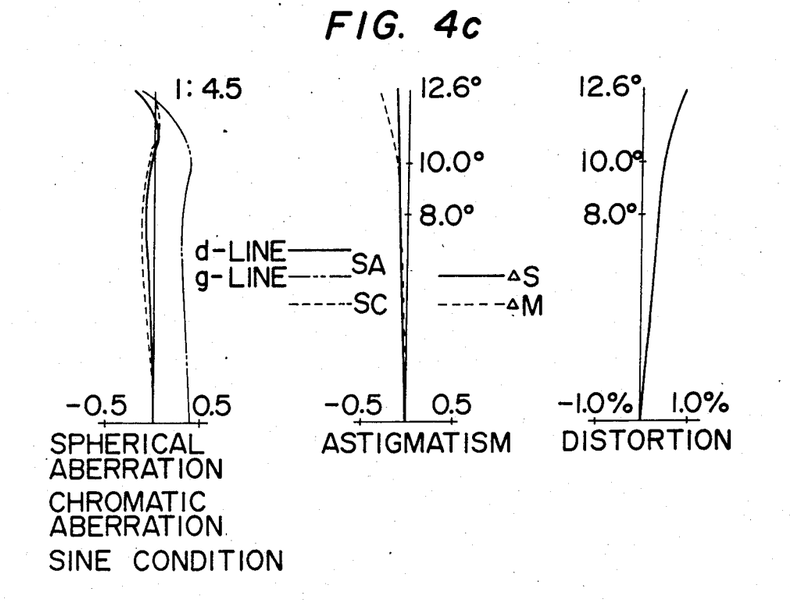

FIGS. 3 and 4 are relevant to this example.

| | | 1 : 4.5 | f = 100-195 | | ω = 24.1°-12.6° | |
|---|---|---|---|---|---|---|
| LENS | | LENS SURFACE NO. | r | d | N | ν |
| FIRST LENS GROUP I | L1 | $r_1 =$ | 160.739 | $d_1 = 4.27$ | $N_1 = 1.83400$ | $\nu_1 = 37.2$ |
| | | $r_2 =$ | 57.389 | $d_2 = 14.27$ | | |
| | L2 | $r_3 =$ | −562.548 | $d_3 = 3.05$ | $N_2 = 1.50048$ | $\nu_2 = 65.9$ |
| | | $r_4 =$ | 243.040 | $d_4 = 3.17$ | | |
| | L3 | $r_5 =$ | 81.441 | $d_5 = 7.56$ | $N_3 = 1.80518$ | $\nu_3 = 25.4$ |
| | | $r_6 =$ | 182.353 | $d_6 = 76.15$ | | |
| SECOND LENS GROUP II | L4 | $r_7 =$ | 75.910 | $d_7 = 6.95$ | $N_4 = 1.69680$ | $\nu_4 = 55.5$ |
| | | $r_8 =$ | 355.164 | $d_8 = 0.12$ | | |
| | L5 | $r_9 =$ | 46.506 | $d_9 = 6.71$ | $N_5 = 1.72916$ | $\nu_5 = 54.7$ |
| | | $r_{10} =$ | 100.679 | $d_{10} = 0.12$ | | |
| | L5' | $r_{11} =$ | 50.310 | $d_{11} = 4.88$ | $N_{5'} = 1.51633$ | $\nu_{5'} = 64.1$ |
| | | $r_{12} =$ | 73.459 | $d_{12} = 4.31$ | | |
| | L6 | $r_{13} =$ | 168.928 | $d_{13} = 6.16$ | $N_6 = 1.80518$ | $\nu_6 = 25.4$ |
| | | $r_{14} =$ | 31.337 | $d_{14} = 9.28$ | | |
| | L7 | $r_{15} =$ | 64.957 | $d_{15} = 6.05$ | $N_7 = 1.58913$ | $\nu_7 = 61.1$ |
| | | $r_{16} =$ | 1698.410 | $d_{16} = 7.24$ | | |
| THIRD LENS GROUP III | L8 | $r_{17} =$ | 2605.318 | $d_{17} = 4.88$ | $N_8 = 1.59270$ | $\nu_8 = 35.3$ |
| | | $r_{18} =$ | −49.246 | $d_{18} = 1.78$ | | |
| | L9 | $r_{19} =$ | −46.725 | $d_{19} = 2.68$ | $N_9 = 1.69680$ | $\nu_9 = 55.5$ |
| | | $r_{20} =$ | 43.836 | $d_{20} = 1.44$ | | |
| | L10 | $r_{21} =$ | 49.137 | $d_{21} = 5.49$ | $N_{10} = 1.64000$ | $\nu_{10} = 60.1$ |
| | | $r_{22} =$ | −259.493 | | | |

| OVERALL FOCAL LENGTH (f) | 100 | 150 | 195 |
|---|---|---|---|
| $d_6$ | 76.15 | 24.38 | 0.49 |

$f_W/f_{WIII} = 1.222$ $f_W/|f_{III}| = 0.228$ $f_W/f_{III1} = 1.225$ $l_{III1}/f_W = 0.0178$ $\Sigma p_{III} = -0.101$ The stop diaphragm is 8.29 after the fourteenth surface. The fixed stop diaphragm is 1 after the twenty-second surface and movable in response to the variation of the overall focal length.

| OVERALL FOCAL LENGTH (f) | 100 | 150 | 195 |
|---|---|---|---|
| l | 3.41 | 14.81 | 22.72 |

The aperture of the fixed diaphragm is 15.24.

EXAMPLE 3

Figure 5:
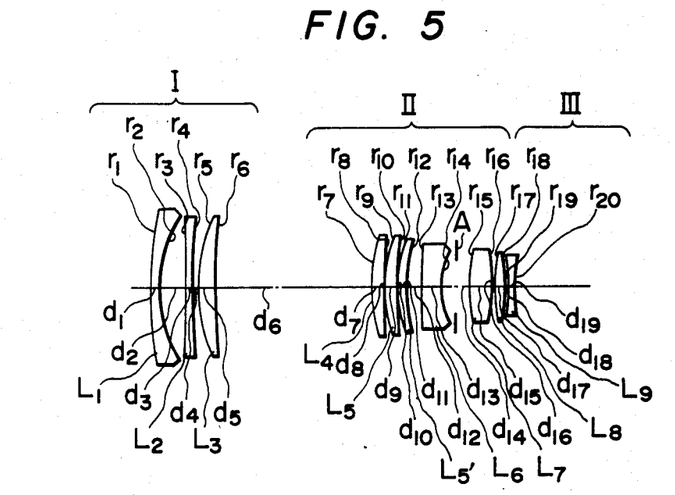
FIG. 5 shows a lens construction at the short focal length end corresponding to Example 3.
Figure 6A:
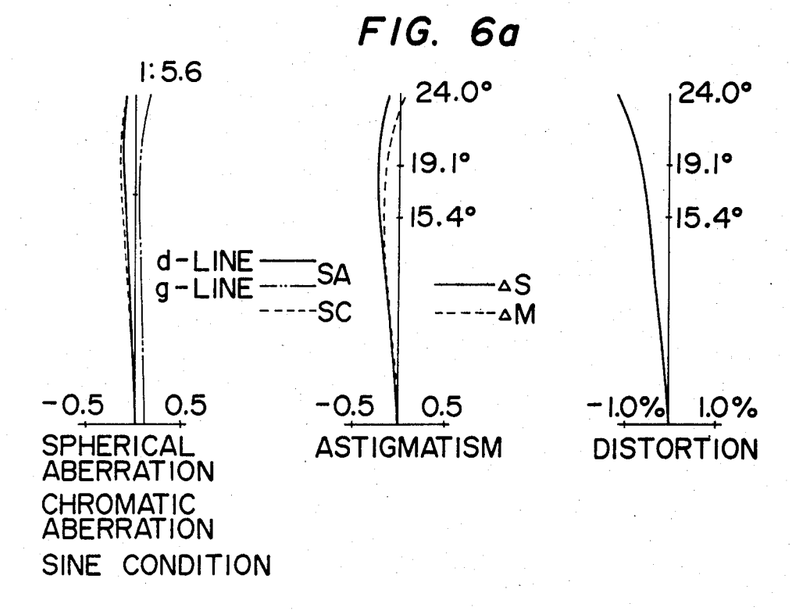
FIGS. 6a, 6b and 6c show graphs of the various aberrations of Example 3.
Figure 6B:
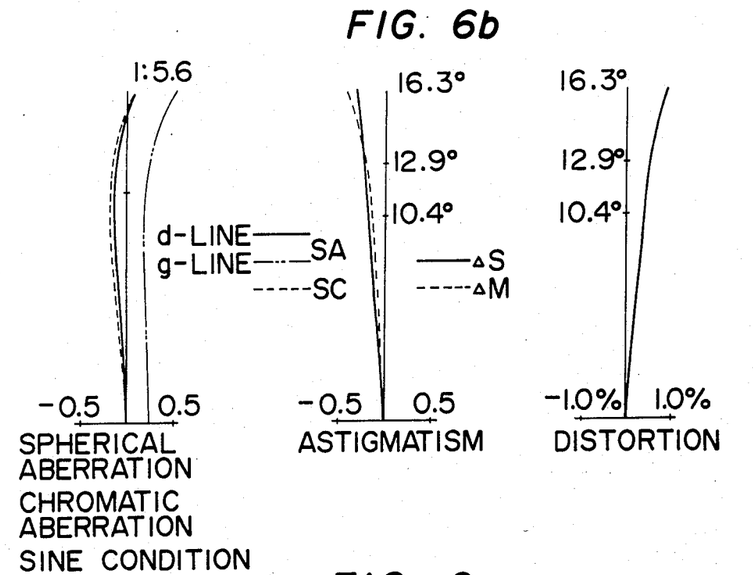
Figure 6C:
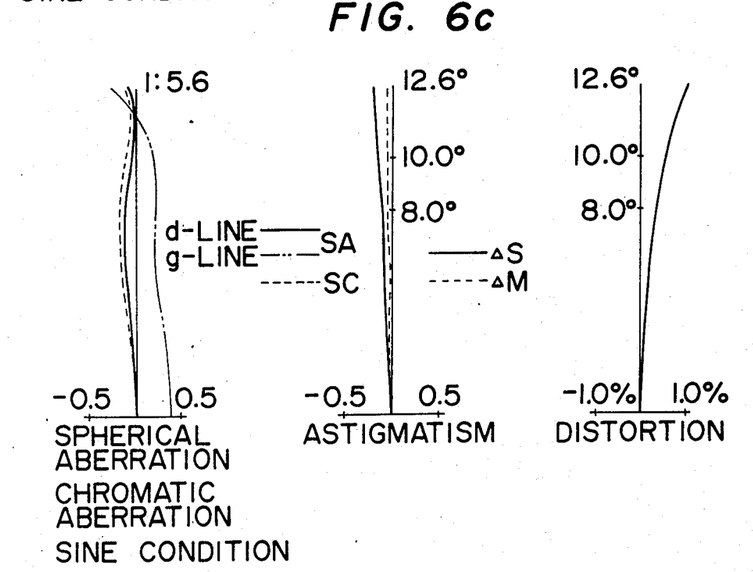

FIGS. 5 and 6 are relevant to this example.

| | LENS | 1 : 5.60 LENS SURFACE NO. | f = 100–195 r | d | ω = 24.0°–12.6° N | ν |
|---|---|---|---|---|---|---|
| FIRST LENS GROUP I | $L_1$ | $r_1 =$ | 247.982 | $d_1 = 3.61$ | $N_1 = 1.83400$ | $\nu_1 = 37.2$ |
| | | $r_2 =$ | 56.899 | $d_2 = 10.72$ | | |
| | $L_2$ | $r_3 =$ | −4553.575 | $d_3 = 2.93$ | $N_2 = 1.80400$ | $\nu_2 = 46.6$ |
| | | $r_4 =$ | 264.703 | $d_4 = 3.70$ | | |
| | $L_3$ | $r_5 =$ | 82.200 | $d_5 = 6.44$ | $N_3 = 1.80518$ | $\nu_3 = 25.4$ |
| | | $r_6 =$ | 302.284 | $d_6 = 68.39$ | | |
| SECOND LENS GROUP II | $L_4$ | $r_7 =$ | 67.126 | $d_7 = 5.37$ | $N_4 = 1.64000$ | $\nu_4 = 60.1$ |
| | | $r_8 =$ | 255.744 | $d_8 = 0.12$ | | |
| | $L_5$ | $r_9 =$ | 54.277 | $d_9 = 4.88$ | $N_5 = 1.72916$ | $\nu_5 = 54.7$ |
| | | $r_{10} =$ | 120.758 | $d_{10} = 0.12$ | | |
| | $L_{5'}$ | $r_{11} =$ | 44.629 | $d_{11} = 4.39$ | $N_{5'} = 1.51821$ | $\nu_{5'} = 65.0$ |
| | | $r_{12} =$ | 75.505 | $d_{12} = 6.73$ | | |
| | $L_6$ | $r_{13} =$ | 238.778 | $d_{13} = 8.98$ | $N_6 = 1.80518$ | $\nu_6 = 25.4$ |
| | | $r_{14} =$ | 30.186 | $d_{14} = 12.67$ | | |
| | $L_7$ | $r_{15} =$ | 63.005 | $d_{15} = 9.91$ | $N_7 = 1.62230$ | $\nu_7 = 53.2$ |
| | | $r_{16} =$ | −130.347 | $d_{16} = 1.64$ | | |
| THIRD LENS GROUP III | $L_8$ | $r_{17} =$ | 94.915 | $d_{17} = 4.31$ | $N_8 = 1.59270$ | $\nu_8 = 35.3$ |
| | | $r_{18} =$ | −55.200 | $d_{18} = 1.47$ | | |
| | $L_9$ | $r_{19} =$ | −52.075 | $d_{19} = 1.90$ | $N_9 = 1.80400$ | $\nu_9 = 46.6$ |
| | | $r_{20} =$ | 82.384 | | | |

| OVERALL FOCAL LENGTH (f) | 100 | 150 | 195 |
|---|---|---|---|
| $d_6$ | 68.39 | 21.77 | 0.25 |

$f_W/f_{WIII} = 1.603$ $f_W/|f_{III}| = 0.733$ $f_W/f_{III1} = 1.680$ $l_{III1}/f_W = 0.0147$ $\Sigma p_{III} = -0.331$ The stop diaphragm is positioned 5.86 after the fourteenth surface.

EXAMPLE 4

Figure 7:
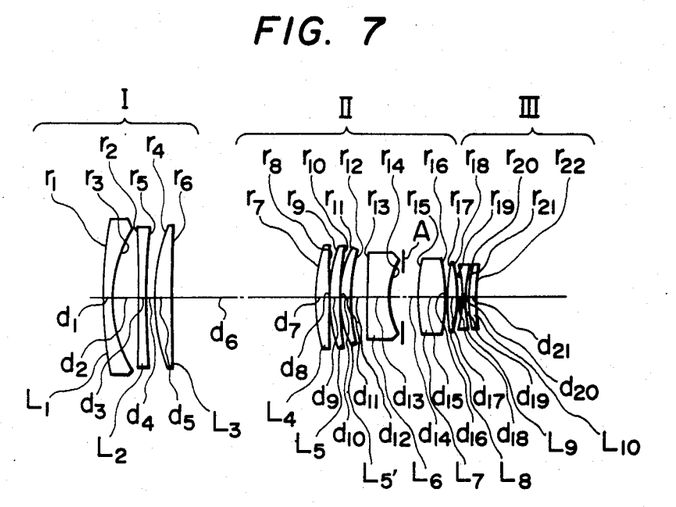
FIG. 7 shows a lens construction at the short focal length end corresponding to Example 4.
Figure 8A:
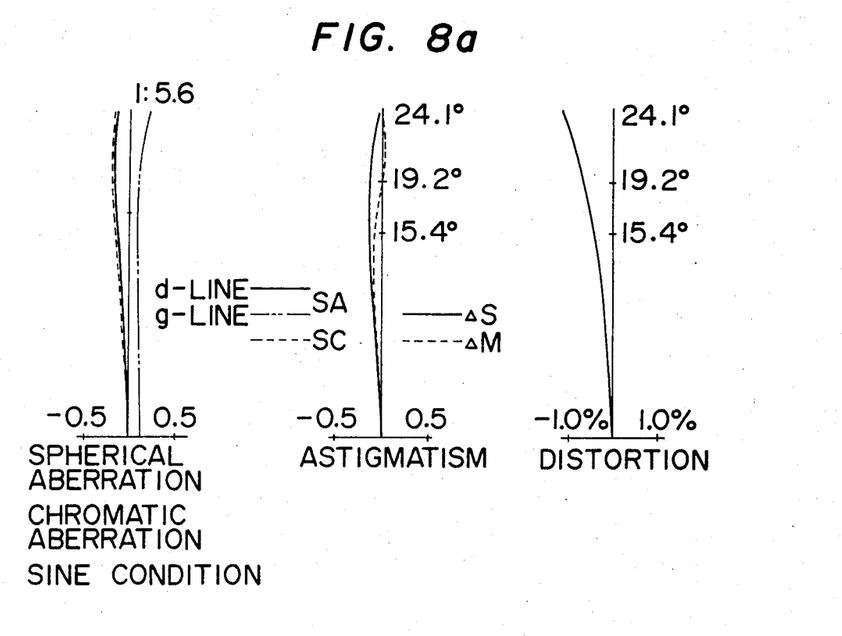
FIGS. 8a, 8b and 8c show graphs of the various aberrations of Example 4.
Figure 8B:
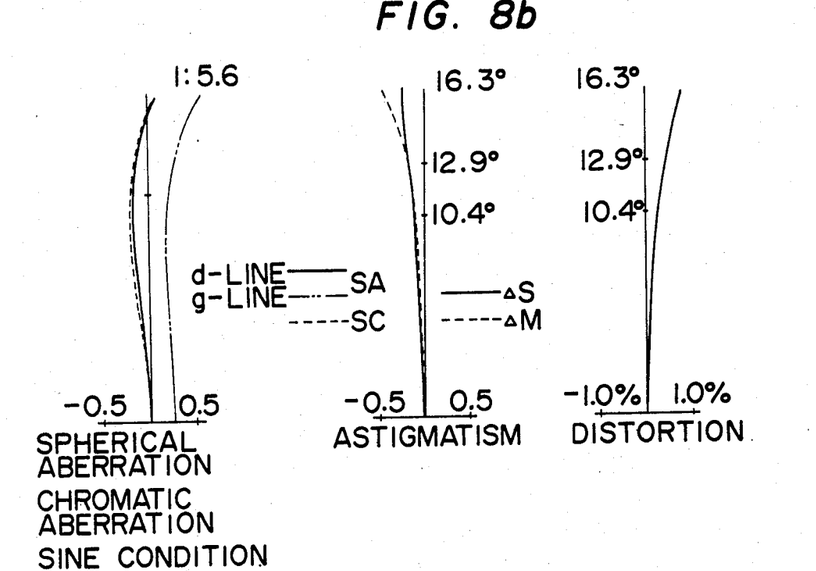
Figure 8C:
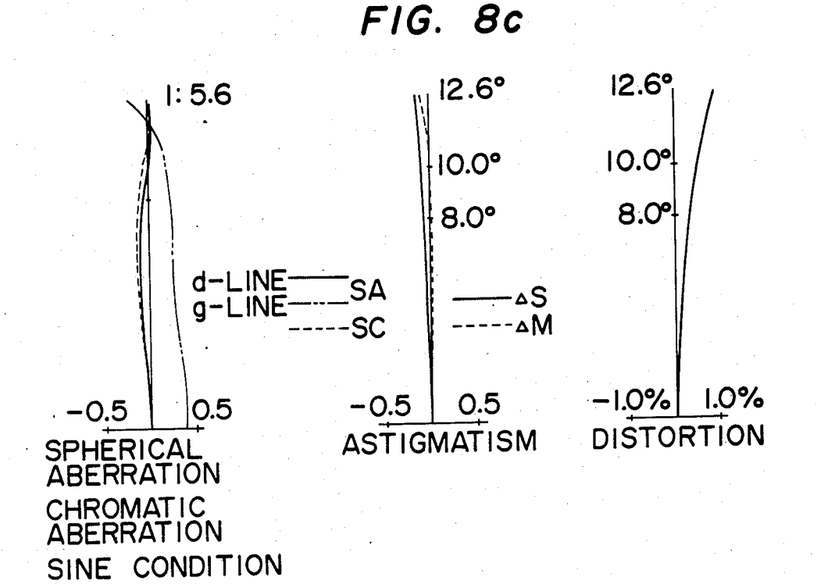

FIGS. 7 and 8 are relevant to this example.

| | 1 : 5.60 LENS SURFACE | f = 100–195 | | ω = 24.1°–12.6° | |
|---|---|---|---|---|---|

-continued

| LENS | NO. | r | d | N | ν |
|---|---|---|---|---|---|
| FIRST LENS GROUP I | $L_1$ | $r_1 = 241.483$ | $d_1 = 3.61$ | $N_1 = 1.83400$ | $\nu_1 = 37.2$ |
| | | $r_2 = 56.890$ | $d_2 = 10.71$ | | |
| | $L_2$ | $r_3 = -3723.676$ | $d_3 = 2.93$ | $N_2 = 1.80400$ | $\nu_2 = 46.6$ |
| | | $r_4 = 227.643$ | $d_4 = 4.53$ | | |
| | $L_3$ | $r_5 = 84.819$ | $d_5 = 6.44$ | $N_3 = 1.80518$ | $\nu_3 = 25.4$ |
| | | $r_6 = 364.197$ | $d_6 = 64.94$ | | |
| SECOND LENS GROUP II | $L_4$ | $r_7 = 67.367$ | $d_7 = 5.37$ | $N_4 = 1.64000$ | $\nu_4 = 60.1$ |
| | | $r_8 = 263.198$ | $d_8 = 0.12$ | | |
| | $L_5$ | $r_9 = 54.131$ | $d_9 = 4.88$ | $N_5 = 1.72916$ | $\nu_5 = 54.7$ |
| | | $r_{10} = 120.235$ | $d_{10} = 0.12$ | | |
| | $L_{5'}$ | $r_{11} = 44.348$ | $d_{11} = 4.39$ | $N_{5'} = 1.51821$ | $\nu_{5'} = 65.0$ |
| | | $r_{12} = 75.268$ | $d_{12} = 6.53$ | | |
| | $L_6$ | $r_{13} = 226.418$ | $d_{13} = 8.99$ | $N_6 = 1.80518$ | $\nu_6 = 25.4$ |
| | | $r_{14} = 30.668$ | $d_{14} = 13.39$ | | |
| | $L_7$ | $r_{15} = 67.029$ | $d_{15} = 12.12$ | $N_7 = 1.62230$ | $\nu_7 = 53.2$ |
| | | $r_{16} = -126.950$ | $d_{16} = 0.39$ | | |
| THIRD LENS GROUP III | $L_8$ | $r_{17} = 91.585$ | $d_{17} = 4.88$ | $N_8 = 1.59270$ | $\nu_8 = 35.3$ |
| | | $r_{18} = -55.528$ | $d_{18} = 1.45$ | | |
| | $L_9$ | $r_{19} = -50.958$ | $d_{19} = 1.95$ | $N_9 = 1.80400$ | $\nu_9 = 46.6$ |
| | | $r_{20} = 49.208$ | $d_{20} = 0.78$ | | |
| | $L_{10}$ | $r_{21} = 48.151$ | $d_{21} = 3.51$ | $N_{10} = 1.69680$ | $\nu_{10} = 55.5$ |
| | | $r_{22} = 85.963$ | | | |

| OVERALL FOCAL LENGTH (f) | 100 | 150 | 195 |
|---|---|---|---|
| $d_6$ | 64.94 | 20.73 | 0.33 |

$f_W/f_{WIII} = 1.604$ $f_W/|f_{III}| = 0.758$ $f_W/f_{III1} = 1.693$ $l_{III}/f_W = 0.0145$ $\Sigma p_{III} = -0.329$ The stop diaphragm is positioned 5.85 after the fourteenth surface.

In the examples, all of the linear dimensions are in millimeters.

I claim:

1. In a zoom lens having a small distortion, including a front lens group having a negative focal length and a rear lens group having a positive focal length, the front and rear lens groups being mechanically movable to vary the overall focal length while maintaining the image position constant, the improvement comprising; the front lens group, a first lens group I, the rear lens group comprising a second lens group II having a positive focal length, and a third lens group III having a negative focal length, wherein the following conditions are satisfied by said three lens groups:

(1) the first lens group I consists, in order from the object, of a negative lens $L_1$, a negative lens $L_2$ and a positive lens $L_3$, (2) the second lens group II consists, in order from the object side, of a positive lens $L_4$, a positive lens $L_5$, a negative lens $L_6$ and a positive lens $L_7$, and (3) the third lens group III consists, in order from the object side, of a positive lens $L_8$ having a strong convex surface on the image side directed to the image, a negative double concave lens $L_9$ and, a positive lens $L_{10}$ having a strong convex surface on the object side directed to the object;

the lens system further defined as follows:

| | aperture ratio 1:4.50 | | focal length f= 100 -195 | half of viewing angle ω=24.1° -12.6° |
|---|---|---|---|---|

| | Lens | Lens Surface No. | r | d | N | ν |
|---|---|---|---|---|---|---|
| First Lens Group I | $L_1$ | $r_1=$ | 156.344 | $d_1=$ 4.27 | $N_1=$ 1.83400 | $\nu_1=$ 37.2 |
| | | $r_2=$ | 56.516 | $d_2=$ 14.27 | $N_2=$ | $\nu_2=$ |
| | $L_2$ | $r_3=$ | -393.706 | $d_3=$ 3.05 | 1.50048 | 65.9 |
| | | $r_4=$ | 390.567 | $d_4=$ 1.78 | $N_3=$ | $\nu_3=$ |
| | $L_3$ | $r_5=$ | 78.629 | $d_5=$ 7.56 | 1.80518 | 25.4 |
| | | $r_6=$ | 164.075 | $d_6=$ 78.43 | | |
| Second Lens | $L_4$ | $r_7=$ | 72.444 | $d_7=$ 6.95 | $N_4=$ 1.670000 | $\nu=$ 57.4 |
| | | $r_8=$ | 1026.876 | $d_8=$ 0.12 | | |
| | $L_5$ | $r_9=$ | 42.680 | $d_9=$ 10.84 | $N_5=$ 1.77250 | $\nu_5=$ 49.6 |
| | | $r_{10}=$ | 96.602 | $d_{10}=$ 3.95 | | |
| | | | | $d_{11}=$ | $N_6=$ | $\nu_6=$ |

-continued

| | | | r | d | N | ν |
|---|---|---|---|---|---|---|
| Group II | L$_6$ | | r$_{11}$ = 196.755 | 6.15 | 1.80518 | 25.4 |
| | | | r$_{12}$ = 31.451 | d$_{12}$ = 9.51 | | |
| | L$_7$ | | r$_{13}$ = 55.109 | d$_{13}$ = 6.30 | N$_7$ = 1.61720 | ν$_7$ = 54.0 |
| | | | r$_{14}$ = 307.171 | d$_{14}$ = 7.67 | | |
| | | | r$_{15}$ = −36212.899 | d$_{15}$ = 5.24 | N$_8$ = 1.59551 | ν$_8$ = 39.2 |
| | L$_8$ | | r$_{16}$ = −46.988 | d$_{16}$ = 1.91 | | |
| Third Lens Group III | | | r$_{17}$ = −44.294 | d$_{17}$ = 2.44 | N$_9$ = 1.69680 | ν$_9$ = 55.5 |
| | L$_9$ | | r$_{18}$ = 43.651 | d$_{18}$ = 1.44 | | |
| | L$_{10}$ | | r$_{19}$ = 50.073 | d$_{19}$ = 5.49 | N$_{10}$ = 1.62041 | ν$_{10}$ = 60.3 |
| | | | r$_{20}$ = −170.978 | | | |

2. In a zoom lens having a small distortion, including a front lens group having a negative focal length and a rear lens group having a positive focal length, the front and rear lens groups being mechanically movable to vary the overall focal length while maintaining the image position constant, the improvement comprising; the front lens group, a first lens group I, the rear lens group comprising a second lens group II having a positive focal length, and a third lens group III having a negative focal length, wherein the following conditions are satisfied by said three lens groups:

(1) the first lens group I consists, in order from the object, of a negative lens L$_1$, a negative lens L$_2$ and a positive lens L$_3$, (2) the second lens group II consists, in order from the object side, of a positive lens L$_4$, a positive lens L$_5$, a positive lens L$_{5'}$, a negative lens L$_6$ and a positive lens L$_7$, and (3) the third lens group III consists, in order from the object side, of a positive lens L$_8$ having a strong convex surface on the image side directed to the image, a negative double concave lens L$_9$ and, a positive lens L$_{10}$ having a strong convex surface on the object side directed to the object; and the lens system further defined as follows:

| | | | 1 : 4.5 | f = 100−195 | ω = 24.1°−12.6° | | |
|---|---|---|---|---|---|---|---|
| | LENS | LENS SURFACE NO. | r | d | N | ν | |
| FIRST LENS GROUP I | L$_1$ | r$_1$ = | 160.739 | d$_1$ = 4.27 | N$_1$ = 1.83400 | ν$_1$ = 37.2 |
| | | r$_2$ = | 57.389 | d$_2$ = 14.27 | | |
| | L$_2$ | r$_3$ = | −562.548 | d$_3$ = 3.05 | N$_2$ = 1.50048 | ν$_2$ = 65.9 |
| | | r$_4$ = | 243.040 | d$_4$ = 3.17 | | |
| | L$_3$ | r$_5$ = | 81.441 | d$_5$ = 7.56 | N$_3$ = 1.80518 | ν$_3$ = 25.4 |
| | | r$_6$ = | 182.353 | d$_6$ = 76.15 | | |
| SECOND LENS GROUP II | L$_4$ | r$_7$ = | 75.910 | d$_7$ = 6.95 | N$_4$ = 1.69680 | ν$_4$ = 55.5 |
| | | r$_8$ = | 355.164 | d$_8$ = 0.12 | | |
| | L$_5$ | r$_9$ = | 46.506 | d$_9$ = 6.71 | N$_5$ = 1.72916 | ν$_5$ = 54.7 |
| | | r$_{10}$ = | 100.679 | d$_{10}$ = 0.12 | | |
| | L$_{5'}$ | r$_{11}$ = | 50.310 | d$_{11}$ = 4.88 | N$_{5'}$ = 1.51633 | ν$_{5'}$ = 64.1 |
| | | r$_{12}$ = | 73.459 | d$_{12}$ = 4.31 | | |
| | L$_6$ | r$_{13}$ = | 168.928 | d$_{13}$ = 6.16 | N$_6$ = 1.80518 | ν$_6$ = 25.4 |
| | | r$_{14}$ = | 31.337 | d$_{14}$ = 9.28 | | |
| | L$_7$ | r$_{15}$ = | 64.957 | d$_{15}$ = 6.05 | N$_7$ = 1.58913 | ν$_7$ = 61.1 |
| | | r$_{16}$ = | 1698.410 | d$_{16}$ = 7.24 | | |
| THIRD LENS GROUP III | L$_8$ | r$_{17}$ = | 2605.318 | d$_{17}$ = 4.88 | N$_8$ = 1.59270 | ν$_8$ = 35.3 |
| | | r$_{18}$ = | −49.246 | d$_{18}$ = 1.78 | | |
| | L$_9$ | r$_{19}$ = | −46.725 | d$_{19}$ = 2.68 | N$_9$ = 1.69680 | ν$_9$ = 55.5 |
| | | r$_{20}$ = | 43.836 | d$_{20}$ = 1.44 | | |
| | L$_{10}$ | r$_{21}$ = | 49.137 | d$_{21}$ = 5.49 | N$_{10}$ = 1.64000 | ν$_{10}$ = 60.1 |
| | | r$_{22}$ = | −259.493 | | | |

3. In a zoom lens having a small distortion, including a front lens group having a negative focal length and a rear lens group having a positive focal length, the front and rear lens groups being mechanically movable to vary the overall focal length while maintaining the image position constant, the improvement comprising; the front lens group, a first lens group I, the rear lens group comprising a second lens group II having a positive focal length, and a third lens group III having a negative focal length, wherein the following conditions are satisfied by said three lens groups:

(1) the first lens group I consists, in order from the object, of a negative lens L$_1$, a negative lens L$_2$ and a positive lens L$_3$, (2) the second lens group II consists, in order from the object side, of a positive lens L$_4$, a positive lens L$_5$, a positive lens L$_{5'}$, a negative lens L$_6$ and a positive lens L$_7$, and (3) the third lens group III consists, in order from the object side, of a positive lens $L_8$ having a strong convex surface on the image side directed to the image, and a negative double concave lens $L_9$; and the lens system further defined as follows:

| | LENS | LENS SURFACE NO. | 1 : 5.60 r | f = 100-195 d | N | ω = 24.0°-12.6° ν |
|---|---|---|---|---|---|---|
| FIRST LENS GROUP I | $L_1$ | $r_1 =$ | 247.982 | $d_1 = 3.61$ | $N_1 = 1.83400$ | $ν_1 = 37.2$ |
| | | $r_2 =$ | 56.899 | $d_2 = 10.72$ | | |
| | $L_2$ | $r_3 =$ | −4553.575 | $d_3 = 2.93$ | $N_2 = 1.80400$ | $ν_2 = 46.6$ |
| | | $r_4 =$ | 264.703 | $d_4 = 3.70$ | | |
| | $L_3$ | $r_5 =$ | 82.200 | $d_5 = 6.44$ | $N_3 = 1.80518$ | $ν_3 = 25.4$ |
| | | $r_6 =$ | 302.284 | $d_6 = 68.39$ | | |
| SECOND LENS GROUP II | $L_4$ | $r_7 =$ | 67.126 | $d_7 = 5.37$ | $N_4 = 1.64000$ | $ν_4 = 60.1$ |
| | | $r_8 =$ | 255.744 | $d_8 = 0.12$ | | |
| | $L_5$ | $r_9 =$ | 54.277 | $d_9 = 4.88$ | $N_5 = 1.72916$ | $ν_5 = 54.7$ |
| | | $r_{10} =$ | 120.758 | $d_{10} = 0.12$ | | |
| | $L_{5'}$ | $r_{11} =$ | 44.629 | $d_{11} = 4.39$ | $N_{5'} = 1.51821$ | $ν_{5'} = 65.0$ |
| | | $r_{12} =$ | 75.505 | $d_{12} = 6.73$ | | |
| | $L_6$ | $r_{13} =$ | 238.778 | $d_{13} = 8.98$ | $N_6 = 1.80518$ | $ν_6 = 25.4$ |
| | | $r_{14} =$ | 30.186 | $d_{14} = 12.67$ | | |
| | $L_7$ | $r_{15} =$ | 63.005 | $d_{15} = 9.91$ | $N_7 = 1.62230$ | $ν_7 = 53.2$ |
| | | $r_{16} =$ | −130.347 | $d_{16} = 1.64$ | | |
| THIRD LENS GROUP III | $L_8$ | $r_{17} =$ | 94.915 | $d_{17} = 4.31$ | $N_8 = 1.59270$ | $ν_8 = 35.3$ |
| | | $r_{18} =$ | −55.200 | $d_{18} = 1.47$ | | |
| | $L_9$ | $r_{19} =$ | −52.075 | $d_{19} = 1.90$ | $N_9 = 1.80400$ | $ν_9 = 46.6$ |
| | | $r_{20} =$ | 82.384 | | | |

4. In a zoom lens having a small distortion, including a front lens group having a negative focal length and a rear lens group having a positive focal length, the front and rear lens groups being mechanically movable to vary the overall focal length while maintaining the image position constant, the improvement comprising; the front lens group, a first lens group I, the rear lens group comprising a second lens group II having a positive focal length, and a third lens group III having a negative focal length, wherein the following conditions are satisfied by said three lens groups:

(1) the first lens group I consists, in order from the object, of a negative lens $L_1$, a negative lens $L_2$ and a positive lens $L_3$, (2) the second lens group II consists, in order from the object side, of a positive lens $L_4$, a positive lens $L_5$, a positive lens $L_{5'}$, a negative lens $L_6$ and a positive lens $L_7$, and (3) the third lens group III consists, in order from the object side, of a positive lens $L_8$ having a strong convex surface on the image side directed to the image, a negative double concave lens $L_9$ and, a positive lens $L_{10}$ having a strong convex surface on the object side directed to the object; and the lens system further defined as follows:

| | LENS | LENS SURFACE NO. | [1 : 560] 1 : 5.60 r | f = 100-195 d | N | ω = 24.1°-12.6° ν |
|---|---|---|---|---|---|---|
| FIRST LENS GROUP I | $L_1$ | $r_1 =$ | 241.483 | $d_1 = 3.61$ | $N_1 = 1.83400$ | $ν_1 = 37.2$ |
| | | $r_2 =$ | 56.890 | $d_2 = 10.71$ | | |
| | $L_2$ | $r_3 =$ | −3723.676 | $d_3 = 2.93$ | $N_2 = 1.80400$ | $ν_2 = 46.6$ |
| | | $r_4 =$ | 227.643 | $d_4 = 4.53$ | | |
| | $L_3$ | $r_5 =$ | 84.819 | $d_5 = 6.44$ | $N_3 = 1.80518$ | $ν_3 = 25.4$ |
| | | $r_6 =$ | 364.197 | $d_6 = 64.94$ | | |
| | $L_4$ | $r_7 =$ | 67.367 | $d_7 = 5.37$ | $N_4 = 1.64000$ | $ν_4 = 60.1$ |

-continued

| | | | | | | |
|---|---|---|---|---|---|---|
| | | $r_8 =$ | 263.198 | $d_8 = 0.12$ | | |
| | | $r_9 =$ | 54.131 | $d_9 = 4.88$ | $N_5 = 1.72916$ | $\nu_5 = 54.7$ |
| | $L_5$ | $r_{10} =$ | 120.235 | $d_{10} = 0.12$ | | |
| SECOND LENS GROUP II | $L_{5'}$ | $r_{11} =$ | 44.348 | $d_{11} = 4.39$ | $N_{5'} = 1.51821$ | $\nu_{5'} = 65.0$ |
| | | $r_{12} =$ | 75.268 | $d_{12} = 6.53$ | | |
| | $L_6$ | $r_{13} =$ | 226.418 | $d_{13} = 8.99$ | $N_6 = 1.80518$ | $\nu_6 = 25.4$ |
| | | $r_{14} =$ | 30.668 | $d_{14} = 13.39$ | | |
| | $L_7$ | $r_{15} =$ | 67.029 | $d_{15} = 12.12$ | $N_7 = 1.62230$ | $\nu_7 = 53.2$ |
| | | $r_{16} =$ | −126.950 | $d_{16} = 0.39$ | | |
| | $L_8$ | $r_{17} =$ | 91.585 | $d_{17} = 4.88$ | $N_8 = 1.59270$ | $\nu_8 = 35.3$ |
| | | $r_{18} =$ | −55.528 | $d_{18} = 1.45$ | | |
| THIRD LENS GROUP III | $L_9$ | $r_{19} =$ | −50.958 | $d_{19} = 1.95$ | $N_9 = 1.80400$ | $\nu_9 = 46.6$ |
| | | $r_{20} =$ | 49.208 | $d_{20} = 0.78$ | | |
| | $L_{10}$ | $r_{21} =$ | 48.151 | $d_{21} = 3.51$ | $N_{10} = 1.69680$ | $\nu_{10} = 55.5$ |
| | | $r_{22} =$ | 85.963 | | | |

* * * * *